Figure 1:
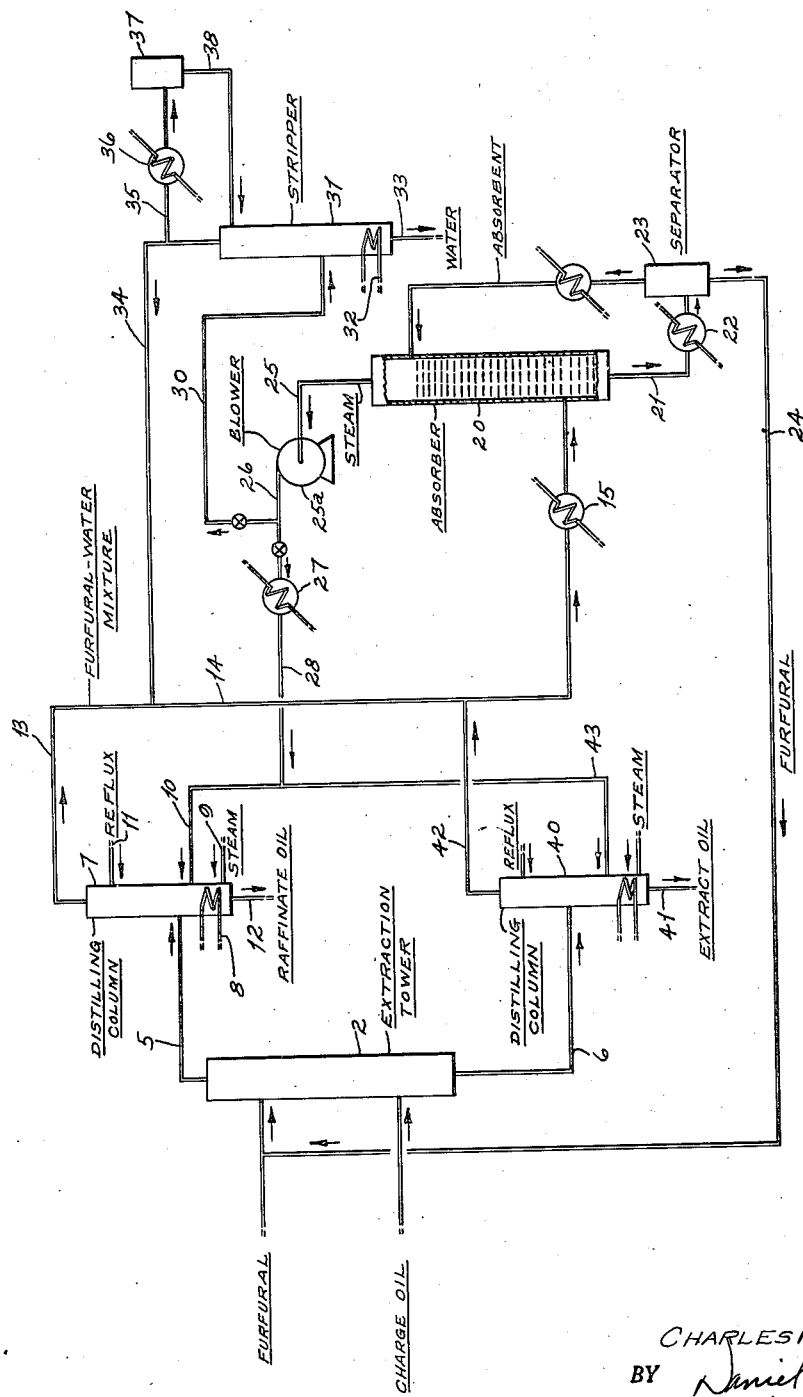
Figure 2:
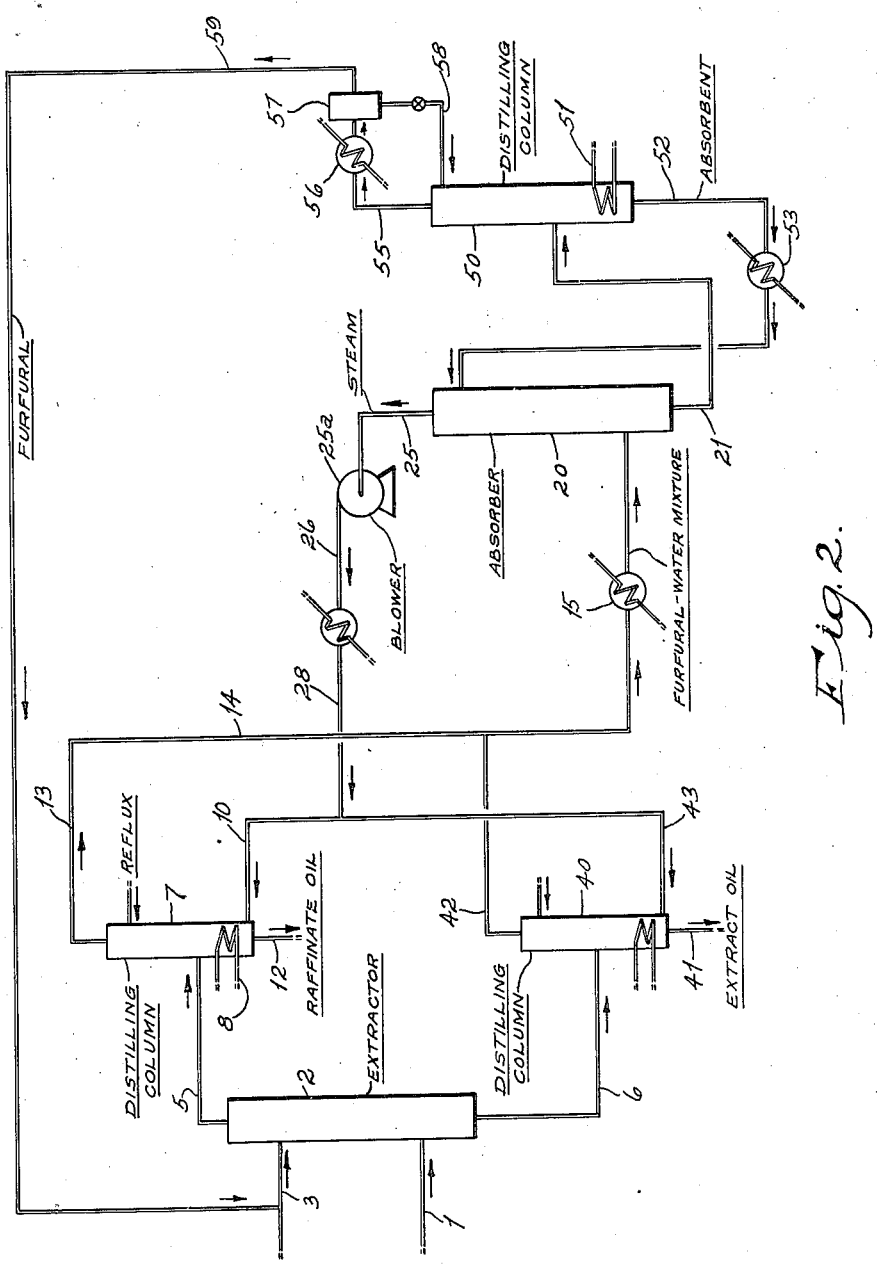

Patented June 7, 1949

2,472,499

UNITED STATES PATENT OFFICE 2,472,499

SOLVENT EXTRACTION OF OIL

Charles M. Stone, Long Beach, Calif., assignor to The Texas Company, New York, N. Y., a corporation of Delaware Application May 7, 1947, Serial No. 746,490

6 Claims. (Cl. 196—14.26)

This invention relates to a method of effecting extraction of oil with a solvent liquid which is at least partially miscible with water at ordinary temperatures or which forms with water a minimum boiling azeotrope.

In accordance with this invention, a charge oil such as derived from crude petroleum is extracted with a selective solvent liquid such as furfural so as to form raffinate and extract phases respectively. These phases comprising oil and solvent liquid are separately treated to separate solvent from the raffinate and extract oil fractions. This treatment involves distilling the solvent from the oil with the aid of steam, thereby obtaining a distillate vapor mixture of solvent and water. This distillate vapor mixture is passed to an absorption zone wherein it is subjected to countercurrent contact with a non-aqueous absorption liquid such as gas oil and which is higher boiling than water under the conditions prevailing in the absorption zone. As a result of this absorptive contact the solvent liquid is absorbed in the absorption liquid and thus removed from the water vapor, the absorptive treatment being carried out under conditions of temperature and pressure such that the water vapor undergoes no substantial condensation. The absorption liquid containing dissolved oil is removed from the absorption tower and cooled or otherwise treated to effect separation between absorption liquid and solvent.

The resulting recovered solvent liquid is recycled for use in the extraction zone.

Water vapor is removed from the absorption zone with a compressor or blower and passed at least in part to the aforesaid distilling operation to provide steam for aiding the distillation. Compression of the water vapor stream imparts some superheat to this stream thereby making it more effective as a distilling medium in the distilling operation.

According to one modification of the invention, all of the water vapor stream removed from the absorption zone is recycled to the distilling operation preferably after heating.

This is advantageous, since the water vapor stream usually contains a small amount of residual solvent liquid.

According to another modification, only a portion of the water vapor stream is passed to the distilling operation with provision for supplying fresh steam thereto. In the latter case, the remaining portion of the water vapor stream is passed to a stripping zone wherein it is subjected to fractional condensation so as to remove a stream of water substantially free from residual solvent, which water is discharged from the system. From this stripping operation there is obtained a constant boiling mixture of solvent and water which can be recycled to the aforesaid absorption zone.

Heretofore in the extraction of hydrocarbon oil with a selective solvent such as furfural, it has been customary to subject the resulting raffinate and extract phase to a series of distilling steps involving vaporization of a portion of the solvent from the oil fractions in the absence of steam, and stripping of the residual solvent from these fractions in the presence of steam. The distillate obtained from the stripping operation has been condensed to effect separation of the bulk of the water from the solvent liquid. However, since the solvent and water are miscible to a substantial extent, the resulting furfural phase contains a substantial amount of dissolved water while the resulting water phase retains a substantial amount of dissolved furfural even at the relatively low temperatures normally prevailing in the condensing equipment. These phases have then been subjected to further distillation in order to recover the furfural.

A feature of the present invention is that it provides a simplified solvent recovery operation and reduces the amount of distillation otherwise required. By the method of this invention all of the solvent is distilled from the raffinate and extract oil fractions with the aid of steam. The resulting distillate comprising furfural and water vapor, without intermediate condensation, and preferably with a small amount of heating, is passed to an absorption tower wherein the solvent is absorbed from the vapor mixture in an absorption liquid in which the solvent is soluble while water vapor is substantially insoluble therein. The absorption is performed under temperature and pressure conditions such that the water remains in the vapor state. The water vapor from which the solvent has been absorbed is repressured and reheated if necessary and then recycled to the previously mentioned distilling operation. This method of operation avoids loss of the latent heat of vaporization of the steam.

In order to describe the invention in more detail, reference will now be made to the figures of the accompanying drawing.

As indicated in Figure I, a charge oil such as a furnace oil or Diesel oil fraction of petroleum is conducted from a source not shown through a pipe 1 to an extraction tower 2, the latter being of the conventional type. A selective solvent such as furfural is introduced to the upper portion of the tower through a pipe 3.

The oil and furfural streams are subjected to countercurrent contact in the tower 2 at an elevated temperature in the range of about 150 to 200° F., so as to effect separation into raffinate and extract phases.

It will be understood that the oil and furfural streams may be pre-heated to any necessary degree prior to introduction to the extraction tower, such heating being accomplished in a conventional manner.

The resulting raffinate phase comprising raffinate oil mixed with a relatively small proportion of the solvent liquid is continuously removed from the upper portion of the tower through a pipe 5, while the extract phase, comprising the extract fraction of the oil dissolved in the major proportion of the solvent liquid is continuously drawn off from the bottom of the tower through a pipe 6.

The raffinate phase stream is passed to a distilling column 7 wherein the solvent is fractionally distilled from the raffinate oil. A reboiler 8 may be provided in the lower portion of the tower and open stream injected into the bottom of the tower through a pipe 9. Additional steam is injected to the lower portion of the tower through a pipe 10 from a source referred to later. Provision may be made for supplying reflux to the top of the column through a pipe 11 so as to control the temperature.

In the usual case, the pressure prevailing at the bottom of the column may be about ten pounds per square inch gauge while that at the top of the tower is about five pounds, reflux being supplied so as to maintain a temperature at the top of the column of about 225° F.

The solvent is thus distilled from the oil, the latter being discharged from the bottom of the tower through a pipe 12.

The resulting distillate comprising furfural and water vapor is removed through a pipe 13 which communicates with a pipe 14 leading to a heat exchanger 15 wherein the distillate vapor mixture may be raised to a temperature of about 240° F. The distillate vapor mixture will comprise about 65% by weight water vapor. It is passed at a pressure of about five pounds gauge, into the lower portion of an absorber 20 provided with suitable packing, and wherein it is subjected to countercurrent contact with absorbent liquid such as gas oil. A temperature of about 220° F. is maintained at the top of the absorption tower with a pressure substantially atmospheric.

The rich absorption oil containing dissolved furfural is drawn off from the bottom of the absorber through a pipe 21 and cooler 22, wherein it is cooled to a temperature of about 80 to 100° F. and passed to a separator 23 wherein separation between oil and furfural occurs.

The separated furfural retaining a small percent of oil, for example about 8 or 10%, is drawn off through a pipe 24 and returned to the extraction tower through pipe 3.

A water vapor stream is drawn off continuously from the top of the absorber 20 through a pipe 25 leading to the suction side of a compressor or centrifugal blower which discharges into a pipe 26 at a pressure of about ten pounds gauge and sufficient to force the vapor back into the distilling column 10. A portion of this repressured water vapor stream, raised to a temperature of about 335° F. as a result of compression, is conducted through a pipe 28 connecting with previously mentioned pipe 10, through which the reheated water vapor is recycled to the distilling column 7. The remainder of the vapor stream not passed to the heater or heat exchanger 27 is conducted through a pipe 30 to the lower portion of a stripper 31, wherein it is subjected to fractional distillation, heat being supplied to the bottom of the stripper through a reboiler 32. A temperature of about 225° F. is maintained at the top of the stripper 31, which is operated under substantially atmospheric pressure. There is discharged from the bottom of the stripper a stream of water substantially free from solvent.

A distillate comprising an azeotropic mixture of furfural and water vapor is removed through a pipe 34 connected with pipe 14 and through which the distillate can be returned to the absorber 20. A portion of the distillate stream from pipe 34 can be by-passed through a pipe 35 and cooler 36 wherein it is condensed and the condensate accumulated in a drum 37 from which it is returned through a pipe 38 as reflux to the stripper 31.

Referring now to the extract phase removed from the extraction tower, this phase is conducted through the pipe 6 to a distilling column 40 which is similar to the distilling column 7 previously described and also operated in a substantially similar manner. In this way the solvent furfural is stripped from the extract oil which later is discharged through pipe 41.

The resulting distillate vapor comprising furfural and steam is continuously removed through a pipe 42 connecting with the previously mentioned pipe 14 through which it is conducted to the absorber 20. Also as indicated in the drawing, a portion of the reheated water vapor stream passing through the pipe 28 may be diverted through a branch pipe 43, and so introduced to the distilling column 40 to provide the steam required therein.

Referring now to Figure II, it will be seen that the extraction tower 2, the distilling columns 7 and 40, the absorber 20, the blower 25A, and connecting pipes have their counterparts in Figure I. The essential distinction in the method of flow illustrated in Figure II over that illustrated in Figure I has to do with the treatment of the stream of absorbent and dissolved solvent after removal from the absorber 20. As shown in Figure II, this stream is drawn off through pipe 21 and introduced directly to a distilling column 50, wherein the solvent is fractionally distilled from the absorbent. The column may be provided with a reboiler 51 to supply the necessary heat for distillation. The denuded absorbent at a temperature above the boiling point of the solvent is continuously drawn off from the bottom of the column 50 through pipe 52 and a heat exchanger 53, wherein it is cooled to a temperature of about 240° F. The cooled absorbent is conducted through pipe 54 from which it is discharged into the top of the absorber 20.

The recovered solvent is removed as a distillate from the top of the column 50 at a temperature of about 323° F. through a pipe 55 and passed through a condenser 56 from which the condensate is discharged into a drum 57. A portion of the condensed liquid may be returned through pipe 58 as reflux to the top of the column 50. The remainder of the recovered solvent is drawn off through a pipe 59 through which it is returned to the pipe 3 for recycling to the extractor 2.

In the operation illustrated in Figure II, it will be seen that the total effluent vapor stream from the top of the absorber 20 is forced by means of a blower 25-A into the pipe 26 and branch pipes 10 and 43 for injection into the lower portion of the distilling columns 7 and 40 respectively. In other words, the heated water vapor stream discharged from the blower 25-A is used to provide all of the steam required in the distilling columns 7 and 40 so that provision for the addition of extraneous steam is unnecessary under settled operating conditions.

While the invention has been described with special reference to the extraction of a specific mineral oil fraction, nevertheless it is contemplated that the invention has application when the extraction is applied to other petroleum fractions, as for example, lubricating oil stocks.

Also, it is contemplated that the invention has application in the case of extractions carried out on oils other than those derived from a mineral source. For example, it may be useful in connection with the solvent extraction of oils derived from vegetable and animal sources. Selective solvents other than furfural are also contemplated. These may include other derivatives of the fural group and other aldehydes such as benzaldehyde. Nitro-benzene and ketones such as aliphatic ketones may be used.

In any case, the invention is particularly concerned with the use of organic solvent liquids which are relatively high boiling and which are miscible at least to some extent with water and which form azeotropes therewith.

Absorbent liquids other than gas oil may be used in the absorber 20. The absorbent liquid may comprise either extract oil or raffinate oil obtained in the extraction operation. It may comprise a portion of the charge oil to the extractor. Advantageously it comprises oil of relatively non-aromatic character and which is immiscible with water or has substantially no solvent action upon water at the temperatures prevailing in the solvent recovery operation. It is also contemplated that instead of mineral oil the absorbent may comprise a conventional solvent liquid which is of substantially different boiling point than the selective solvent being used in the extractor 2.

If in the treatment of relatively low boiling oils, a small amount of the more volatile oil constituents distill over in the azeotrope mixture from the column 7, provision may be made for withdrawing such oil constituents at a later point in the system. These constituents may remain, at least in part, in the recovered solvent and be recycled through the extraction zone. They may accumulate in part in the absorption oil, in which case a portion of this stream may be drawn off through pipe 27 in Figure I or through pipe 27A in Figure II and be conducted to a suitable still for separation of the volatile constituents from the absorption medium, the latter being returned to the system.

Obviously, many modifications and variations of the invention, as hereinbefore set forth, may be made without departing from the spirit and scope thereof, and therefore only such limitations should be imposed as are indicated in the appended claims.

I claim:

1. In the fractional separation of oil by extraction with a water miscible organic solvent liquid wherein a mixture comprising solvent liquid and a fraction of said oil is obtained as a result of said extraction and the solvent is thereafter separated from said oil fraction with the aid of steam in a distillation zone, thereby obtaining a mixture of solvent and water, the method of recovering solvent from said solvent-water mixture which comprises passing said solvent-water mixture to an absorption zone, subjecting it therein to contact with a non-aqueous liquid absorbent for said solvent liquid which is higher boiling than water, effecting said contact at a temperature above the boiling point of water at the pressure prevailing within said absorption zone, separately removing from said zone a vapor stream of water containing some residual solvent and a liquid stream of absorbent containing dissolved solvent, recovering solvent from removed absorbent, recycling a portion of said vapor stream to said distilling zone, passing another portion thereof to a secondary distilling zone, forming a secondary distillate consisting of an azeotropic mixture of solvent and water and a secondary residual liquid comprising water, discharging said residual liquid, and recycling said secondary distillate to said absorption zone.

2. The method according to claim 1 in which the organic solvent liquid is furfural.

3. In the fractional separation of oil by extraction with a water miscible organic solvent wherein a mixture comprising solvent liquid and a fraction of said oil is obtained as a result of said extraction, the method comprising passing said mixture to a distilling zone, fractionally distilling solvent liquid from the oil in the presence of added steam thereby obtaining a mixture of solvent liquid and water, passing resulting solvent-water mixture to an absorption zone, subjecting it therein to contact with a non-aqueous liquid absorbent in said solvent which is higher boiling than water, effecting said contact at a temperature above the boiling point of water at the pressure prevailing within said absorption zone, separately removing from said zone a vapor stream of water containing some residual solvent and a stream of absorbent liquid containing dissolved solvent, passing said vapor stream in part to said distilling zone recovering solvent from said removed stream of absorbent and dissolved solvent, passing another portion of said vapor stream to a secondary distilling zone, forming a secondary distillate consisting of an azeotropic mixture of solvent and water and a secondary residual liquid comprising water, discharging said residual liquid and recycling said secondary distillate to said absorption zone.

4. The method according to claim 3 in which the organic solvent liquid is furfural.

5. In the fractional separation of oil by extraction with a water miscible organic solvent liquid, the method comprising subjecting charge oil and solvent to extraction in an extraction zone, removing from said extraction zone a fraction of said oil mixed with solvent liquid, passing said mixture directly to a stripping zone, separating solvent from oil in said stripping zone with the aid of added steam, thereby obtaining a distillate mixture of solvent and water, passing said solvent-water mixture directly to an absorption zone, subjecting it to contact therein with a non-aqueous liquid absorbent for said solvent and which is higher boiling than water, effecting said contact at a temperature above the boiling point of water at the pressure prevailing within said absorption zone, separately removing from said zone a vapor stream of water containing some residual solvent and a stream of absorbent liquid containing dissolved solvent, recovering solvent from said absorbent, recycling recovered solvent to said extraction zone, passing said vapor stream in part to said stripping zone to provide added steam, passing another portion of said vapor stream to a secondary distilling zone, forming a secondary distillate consisting of an azeotropic mixture of solvent and water and a residual liquid comprising water, discharged said residual liquid and recycling said secondary distillate to said absorption zone.

6. In the fractional separation of oil by extraction with furfural, the method comprising subjecting hydrocarbon oil to extractive contact with furfural in an extraction zone, removing from said zone a fraction of said charge oil mixed with solvent liquid, passing said fraction containing solvent liquid directly to a separating zone, distilling furfural from said oil fraction therein with the aid of added steam, thereby obtaining a distillate comprising furfural and water, passing said distillate directly to an absorption zone, subjecting said distillate to countercurrent contact therein with a non-aqueous absorbent liquid for said solvent and which is higher boiling than water, effecting said countercurrent contact at a temperature above the boiling point of water at the pressure prevailing within said absorption zone, separately removing from said absorption zone a vapor stream of water containing some residual solvent and a stream of absorbent liquid containing dissolved solvent, recovering solvent liquid from said absorbent, recycling recovered solvent and liquid to said extraction zone, passing a portion of said water vapor stream to said separating zone to provide added steam therein, passing another portion of said vapor stream to a secondary distilling zone, forming a secondary distillate consisting of an azeotropic mixture of solvent and water and a secondary residual liquid comprising water, discharging said residual liquid and recycling said secondary distillate to said absorption zone.

CHARLES M. STONE.

REFERENCES CITED

The following references are of record in the file of this patent:

UNITED STATES PATENTS

| Number | Name | Date |
|---|---|---|
| 2,167,730 | Smoley | Aug. 1, 1939 |
| 2,305,248 | Fleer et al. | Dec. 15, 1942 |
| 2,339,786 | Larsen et al. | Jan. 22, 1944 |